United States Patent [19]

Teeter

[11] 4,356,889
[45] Nov. 2, 1982

[54] ADD-ON FORCED LUBRICATION SYSTEM

[75] Inventor: Terry E. Teeter, Mattawan, Mich.

[73] Assignee: Eaton Corporation, Cleveland, Ohio

[21] Appl. No.: 177,703

[22] Filed: Aug. 13, 1980

[51] Int. Cl.³ .............................................. F16N 1/00
[52] U.S. Cl. .................................... 184/6.12; 184/6.3;
184/6.28
[58] Field of Search ..................... 184/6.12, 6.28, 6.24,
184/6.4, 31, 36, 26, 27 R, 14

[56] References Cited
U.S. PATENT DOCUMENTS

| | | | |
|---|---|---|---|
| 2,333,161 | 11/1943 | Dunn | 184/6.12 |
| 2,802,548 | 8/1957 | Mart et al. | 184/6.12 |
| 2,838,039 | 6/1958 | Smith et al. | 184/6.3 X |
| 3,083,790 | 4/1963 | McAfee et al. | 184/6.12 |
| 3,138,965 | 6/1964 | Brey et al. | 74/331 |
| 3,550,724 | 12/1970 | Vollmer | 184/6.12 |
| 3,719,253 | 3/1973 | Dukes et al. | 184/6.12 |
| 4,168,693 | 9/1979 | Harrison | 184/6.4 X |

Primary Examiner—David H. Brown
Attorney, Agent, or Firm—C. H. Grace; F. M. Sajovec

[57] ABSTRACT

An add-on forced lubrication system is provided for assembly to a standard transmission (10). The forced lubrication system comprises a drive adapter (48) mountable to end of a shaft (12) accessible from the exterior of the housing (14) through a removable cover (28), a pump (68) driven by said shaft by a pump drive shaft (66) received in said adapter and mountable to said housing at an interface (74) substantially identical the interface (29) of the removable cover, a first fitting (82) receivable in a first bore (40) communicating with the transmission sump (36) and normally closed by a first plug (42), a lubricant conduit connecting said first filling to the pump inlet (76), a second fitting (94) receivable in a second bore (44) normally sealed by a plug (46) and a conduit (96) connecting said fitting with the pump outlet (78).

15 Claims, 4 Drawing Figures

ADD-ON FORCED LUBRICATION SYSTEM

BACKGROUND OF THE INVENTION

1. Field of the Invention

The present invention relates to an add-on forced lubrication system for a change gear transmission and more particularly relates to an add-on forced lubrication system for a change gear transmission which is adapted for easy assembly to a standard transmission.

2. Description of the Prior Art

Many standard change gear transmissions are provided with a so called splash type lubrication system wherein lubricant is maintained in a lubricant sump of the transmission and is distributed for lubricating and/or cooling purposes by action of the rotating shafts and/or gears passing through the lubricant sump. Various lubricant wipers and/or passages may also be provided as is well known and may be seen by reference to U.S. Pat. Nos. 3,618,711; 3,762,503 and 3,838,751, all of which are hereby incorporated by reference. Such transmissions have proven highly satisfactory for most usage.

In situations wherein additional lubricant filtering is required, wherein additional lubrication and/or cooling is required, such as in extremely heavy duty usage, or in situations wherein additional lubrication is required at a specific location, such as when the vehicle driven by the transmission operates a high percentage of time on severe grades or the transmission is mounted on a severe angle, a forced lubrication system is often required to increase the flow rate of lubricant and/or to direct the flow of lubricant to a specific area of the transmission.

In situations wherein the need for a forced lubrication system is recognized at the time of purchasing the transmission, a specifically modified transmission can be provided. In situations wherein the need for a forced lubrication system is recognized only after the transmission has been in use, the transmission must often be reworked to accept a forced lubrication system.

The above situations are not totally satisfactory as a specifically configured transmission and/or excessive modification of a standard transmission is often required to provide the forced lubrication system.

SUMMARY OF THE INVENTION

In accordance with the present invention, the drawbacks of the prior art have been overcome or minimized by the provision of an add-on forced lubrication system for a standard transmission comprising a housing defining a lubricant sump, a drain hole located in the lubricant sump and normally sealed by a removable plug, a rotating shaft terminating adjacent an end wall of the transmission housing, a removable cover member in the end wall providing access to the end of the shaft and a normally sealed bore, such as a lubricant fill or check bore, located in the transmission housing adjacent the portion of the transmission to be provided with forced lubrication.

The above is accomplished by providing a first lubricant fitting adapted to replace the normally utilized drain plug, a pump housing adapted to attach to the transmission housing at the mounting surface for the cover member, a drive adapter adapted to attach to the end of the shaft and to drive the pump when the shaft is rotated and a second lubricant fitting adapted to mount to the housing in the normally sealed bore. Lubricant conduits are provided from the first fitting to the pump inlet and from the pump outlet to the second fitting. Coolers and/or filters may be provided at various locations in the add-on forced lubrication system.

As may be seen from the above, the add-on forced lubrication system of the present invention requires a minimum or no modification of the existing standard transmission housing and may be quickly and easily assembled to a standard transmission at a location having a minimum of transmission housing reworking capabilities.

Accordingly, it is an object of the present invention to provide an add-on forced lubrication system for a standard transmission which may be relatively quickly and easily assembled to the standard transmission with a minimum of transmission housing and/or internal component modification.

These and other objects and advantages of the present invention will become apparent from a reading of the detailed description of the invention taken in connection with the attached drawings.

DESCRIPTION OF THE PREFERRED EMBODIMENT

Figure 1:
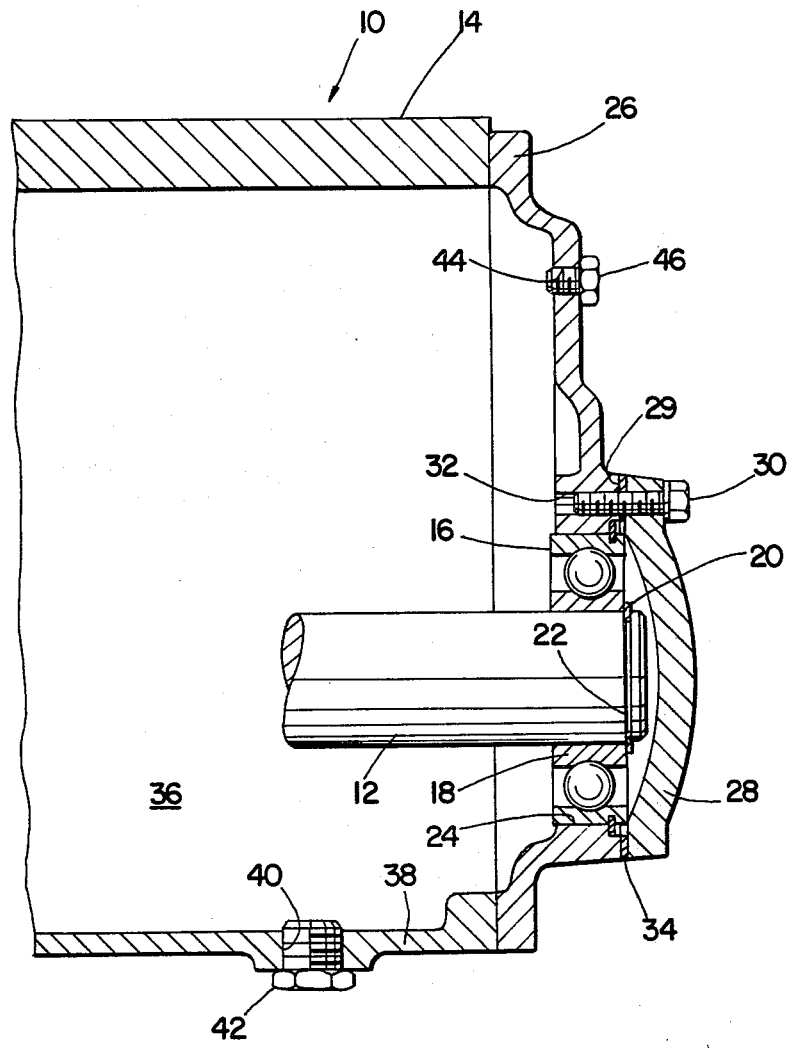
FIG. 1 is a partial view, in section, showing a standard transmission of the type to which the add-on forced lubrication system of the present invention may be assembled.

In this disclosure, certain terminology will be used for convenience in reference only and will not be limiting. For example, the terms "forward" and "rearward" will refer to directions forward and rearward of the vehicle in which the transmission is installed. The terms "rightward" and "leftward" will refer to directions as taken in the drawings in connection with which the terminology is used. The terms "inward" and "outward" will refer to directions toward and away from, respectively, the geometric center of the apparatus. All foregoing terms mentioned include the normal derivatives.

Figure 2:
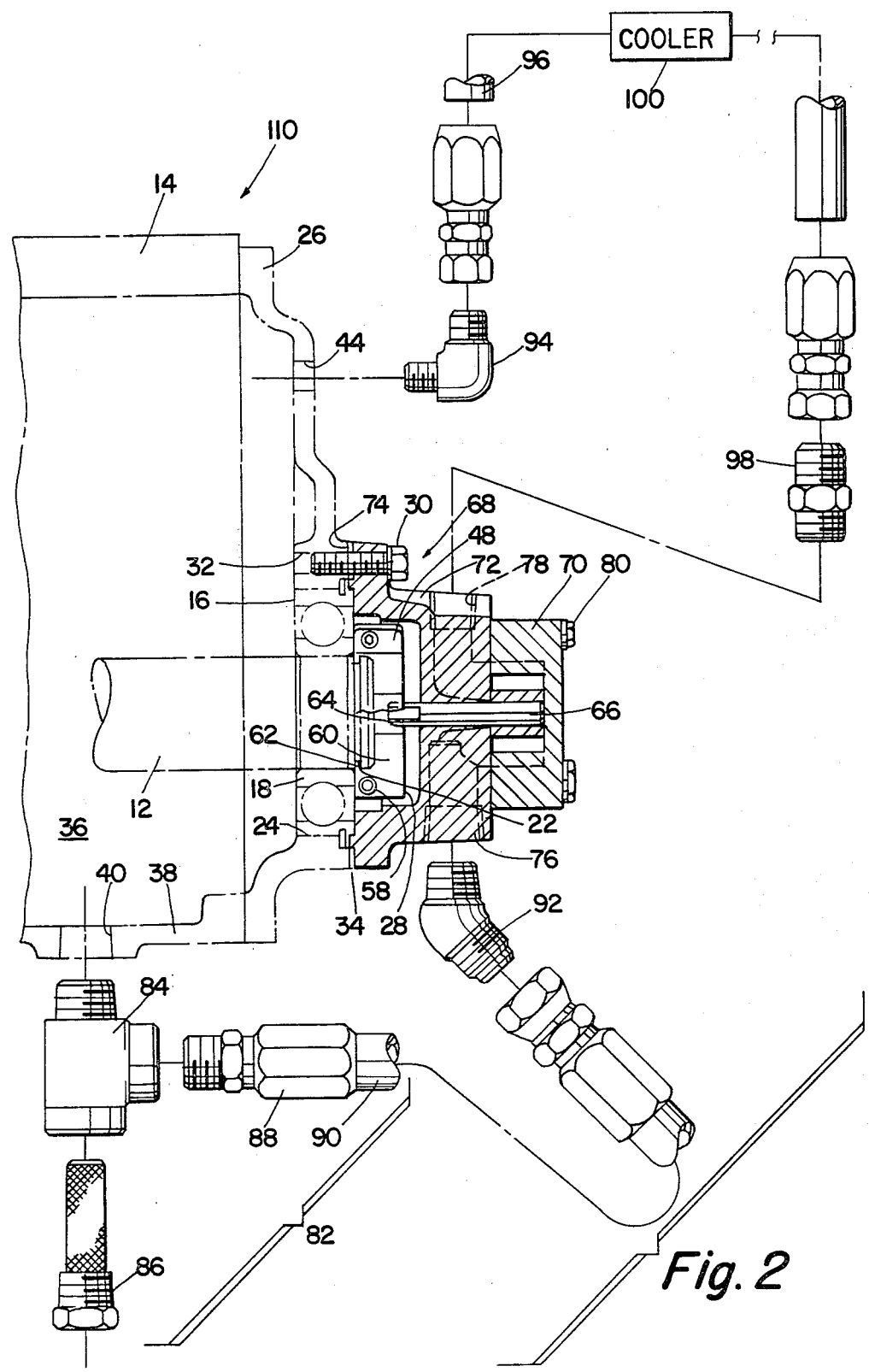
FIG. 2 is a partial exploded view, in section, illustrating the transmission of FIG. 1 when provided with the add-on forced lubrication system of the present invention.

FIG. 1 illustrates the rearward end of a standard transmission 10 of the type to which the add-on pressurized, or forced, lubrication system of the present invention is adapted to be mounted. FIG. 2 illustrates, in an exploded view for ease of understanding, the add-on forced lubrication system as mounted to transmission 110. Like elements of FIGS. 1 and 2 will be assigned like reference numbers.

The rearward portion of a standard change gear transmission 10 is illustrated in FIG. 1. The transmission includes an input shaft (not shown), an output shaft (not shown), a mainshaft (not shown), and a least one countershaft 12. Gearing and clutches (not shown) are provided to selectively vary the ratio of input shaft speed to output shaft speed as is well known in the art. Such transmissions are well known in the art and examples thereof may be seen by reference to U.S. Pat. Nos. 3,105,395 and 3,138,965, hereby incorporated by reference. The various shafts are rotatably retained in the transmission housing 14. Many and/or all of the shafts are supported by bearings, such as bearing 16 which rotatably supports the rearward end of countershaft 12. The inner bearing race 18 of bearing 16 is often axially retained and/or positioned on countershaft 12 by means of a snap ring 20 which is received in an annular recess 22 provided in the shaft 12. Bearing 16 is supported in an annular bore 24 in the rear end wall 26 of the transmission housing. Bore 24 is sealed by a removable bearing cover 28 which is removably mounted to the end wall 26, as by bolts 30 (only one of which is shown) allowing access to the bearing 16 and shaft 12 for service and/or removal of shaft 12 and/or bearing 16. Bolts 30 are threadably engageable in internally threaded bores 32 (only one of which is shown) in end wall 26 which bores 32 define a bolt pattern. A gasket 34 or other sealing member is normally provided to seal the end wall at the opening defined by bore 24.

The lower portion of the transmission housing 14 of transmission 10 generally defines a lubricant sump or reservoir 36 through which some or all of the gears and/or shafts rotate for splash lubrication purposes. The lower portion of the transmission housing 14, preferably the bottom wall 38 is provided with a threaded through bore 40 communicating with the sump 36 for draining purposes. The bore 40 is usually sealed with a removable plug 42, usually referred to as a drain plug.

An upper portion of the transmission housing 14 of transmission 10 is usually provided with at least one threaded through bore 44 which is normally sealed by a threaded plug 46. As at least one of these bores is usually utilized to fill the sump with lubricant or to check lubricant level, the bore 44 may be referred to as a fill or check bore and the plug 46 as a fill or check plug. Standard transmissions often have a plurality of normally sealed bores located above the sump line, such as bore 44, for lubrication purposes, wiring purposes, receipt of auxiliary controls and the like.

It is understood that the end wall 26 of transmission housing 14, as well as the front wall (not shown) thereof often has a plurality of bearing covers for additional countershaft, reverse idler shafts and the like.

FIG. 2 illustrates the structure of the add-on forced lubrication system of the present invention as well as how the add-on forced lubrication system of the present invention may be utilized to easily and quickly convert a standard transmission 10 of the type illustrated in FIG. 1 to a forced lubrication system transmission 110..

To convert transmission 10 to a forced lubrication transmission 110, the bearing cover 28 is removed allowing access to the end of shaft 12. It is specifically understood that any other rotatable shaft being accessible through a removable front or rear end wall cover is suitable for purposes of the present invention.

Figure 3:
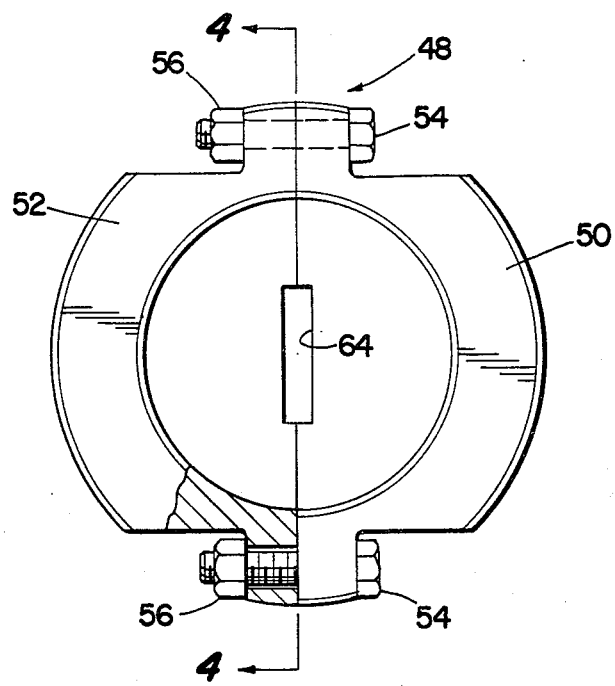
FIG. 3 is a plan view of the drive adapter.
Figure 4:
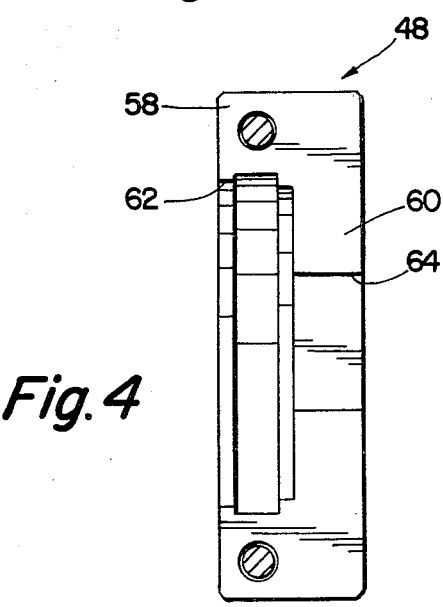
FIG. 4 is a side view of the adapter of FIG. 3.

After bearing cover 28 is removed, snap ring 20 is also removed and replaced with a pump drive adapter 48. Adapter 48 (see FIGS. 3 and 4) is preferably a two-piece structure, of substantially identical pieces 50 and 52, which are held together in compression on the end of shaft 12 by bolts 54 and nuts 56 or bolt in tapped hole for rotation with shaft 12. The adapter 48, when assembled, is a generally cup shaped device defined by an annular side wall 58 and an end wall 60. The sidewall defines a radially inwardly extending rib 62 adapted to be received in snap ring groove 22 and will function to replace the snap ring 20 and to axially position the adapter 48 on the end of shaft 12. The end wall 60, defines a generally centrally located axially extending through slot 64. Slot 64 is adapted to receive a simularly configured end of a driven pump shaft 66 to provide an easily established driving connection between shaft 12 and the driven pump shaft.

It is understood that other types of adapters which may be attached to the end of shaft 12 for rotation therewith are suitable for purposes of the present invention.

After the adapter 48 has been attached to shaft 12, the pump 68 may be attached to the end wall 26 of transmission housing 14. Pump 68 includes a two portion housing comprising a pumping chamber portion 70 and a manifold block portion 72. Manifold portion 72 includes an interface surface 74 substantially identical to the interface surface 29 of the removable bearing cover 28, including an identical bolt pattern allowing the pump to attach to the end wall 26 utilizing the same bolts 30, the same threaded bores 32, in many cases, and the same gasket 34 as were utilized to mount the bearing cover. In certain situations, the interface surface 74 of the pump manifold portion 72 may include additional structure, such as an annular rib as is shown in FIG. 2, to pilot the manifold portion on the bearing 16. The pumping chamber 70 may be of any known structure, such as the illustrated gear pump structure which is driven by driven pump shaft 66. The manifold portion 72 includes a fluid inlet, preferably a threaded bore as shown at 76 and a high pressure outlet, preferably a threaded bore as show at 78. The two portions of pump 68 are attached as by bolts 80.

The drain plug 42 is removed from bore 40 and replaced by a fluid connection member or assembly 82. Connection member 82 may be a simple pipe connector or, as shown, may be a three piece assembly comprising a connector body 84 threadably received in bore 40, a removable strainer 86 and a pipe connector type conduit fitting 88. A suitable lubricant conduit 90 extends from conduit fitting 88 to suitable conduit connector 92 received in the inlet bore 76 of the manifold block 72. It is recognized that a filter device of any known type may be connected along conduit 90.

The plug 46 is removed from normally sealed bore 44 and replaced with a lubricant fitting, such as conduct conduit connector 94. A suitable conduit 96 extends from connector 94 to lubricant fitting 98 received in threaded outlet bore 78 of the pump manifold block. It is appreciated that bore 44 could be located at any location in the transmission housing 14, or that a new bore could be drilled and tapped if required. It is also recognized that fitting 94 could be in the form of a nozzle if required. A known cooler, such as cooler 100 could be connected along conduit 96.

It may thus be seen that the add-on forced lubrication system of the present invention allows a standard transmission to be converted to a forced lubrication transmission by simply replacing existing members without requiring reworking of the transmission housing and/or components with the possible exception of proving a specifically located bore 44. It is also seen that the add-on forced lubrication system of the present invention may be assembled to transmission 110 from the exterior of housing 14.

Although this invention has been described in its preferred form with a certain degree of particularity, it is understood that the present disclosure of the preferred form is made by way of example and that numerous changes in the details of construction and arrangement of the parts is possible without departing from the spirit and the scope of the invention as hereinafter claimed.

I claim:

1. An add-on forced lubrication system for a change gear transmission originally comprising a transmission housing defining an end wall and a lubricant sump, a first through bore located in the sump portion of the housing and adapted to be fitted with a removable first plug, a second through bore in the housing, a second removable plug adapted for normally sealing said second bore, a rotatable transmission shaft having an end located adjacent said end wall, a removable cover mounted to said end wall for sealing an opening provided in said end for providing access from the exterior of said housing to the end of said transmission shaft, said cover having an interface of specific configuration for interface with said end wall, said system comprising:

a drive adapter mountable to the end of said transmission shaft for rotation therewith, said drive adapter comprising a multipiece structure clampable to the end of said transmission shaft and defining a generally cup shaped body having an annular side wall portion for clampingly engaging the end of said transmission shaft and a bottom portion, said bottom portion having a nonannular opening therein;

a pump, said pump having a pump body with an interface substantially identical to the interface of said removable cover for mounting of said pump body to said end wall to seal said opening, said pump having a driven shaft adapted to be received in said nonannular opening in said drive adapter and to be driven thereby, said pump body further defining a pump inlet and a pump outlet;

a first lubricant fitting adapted to be received in said first bore;

a first lubricant conduit for providing fluid communication between said first lubricant fitting and said pump inlet;

a second lubricant fitting adapted to be received in said second bore; and a second lubricant conduit for providing fluid communication between said pump outlet and said second lubricant fitting.

2. The add-on forced lubrication system of claim 1, wherein said interfaces define a plurality of bolt bores defining a bolt pattern substantially identical to a bolt pattern defined by a plurality of threaded bores provided in said end wall adjacent said opening.

3. The add-on forced lubrication system of claim 2, wherein said shaft is rotationally supported in said transmission by an anti-friction bearing journaled in said housing end wall adjacent said opening, said bearing is normally axially located on said shaft by a snap ring received in an annular groove in the outer periphery of said transmission shaft adjacent the end thereof, said adapter side wall portion having a radially inwardly extending rib extending inwardly from the inner radial surface thereof adjacent the end thereof most distant said bottom portion, said rib adapted to received in said groove to axially position said bearing on said shaft.

4. The system of claim 3, wherein said removable cover is a bearing cover.

5. The system of claim 4, wherein said interface of said pump body additionally includes means to pilot said pump body on said bearing.

6. The system of claim 4, wherein transmission said shaft is a countershaft.

7. The system of claim 4, wherein said first and second bores are internally threaded and said first and second plugs are externally threaded.

8. The system of claim 7, wherein said first bore is a drain bore and said first plug is a drain plug.

9. The system of claim 8, wherein said second bore is a lubricant fill bore and said second plug is a fill plug.

10. The system of claim 7, wherein said first and second lubricant connectors are externally threaded for threaded receipt in said first and second bores, respectively.

11. The system of claim 10, wherein said adapter is attachable to said shaft from the exterior of said housing.

12. The system of claims 1, 3 or 10, wherein said first plug, said second plug and said cover are removable from said housing from the exterior of said housing, said first fitting and said second fitting are assemblable to said housing from the exterior of housing, said adapter is attachable to said shaft from the exterior of said housing upon removal of said cover, said pump is attachable to said housing from the exterior of said housing and said conduits are exterior of the housing.

13. The system of claims 1 or 10, wherein a strainer is interposed said first bore and said pump inlet.

14. The system of claim 13, wherein said filter is a portion of said first fitting.

15. The system of claim 1 or 5, wherein a cooler is interposed said pump outlet and said second bore, said cooler exterior of said housing.

* * * * *